United States Patent
Hory et al.

(10) Patent No.: US 6,767,499 B1
(45) Date of Patent: Jul. 27, 2004

(54) FAST PROTOTYPING METHOD BY LASER SINTERING OF POWDER

(75) Inventors: Arnaud Hory, Limoges (FR); Jean-Marie Gaillard, Limoges (FR); Pierre Abelard, Limoges (FR)

(73) Assignee: Ecole Nationale Superieure de Ceramique Industrielle (ENSCI), Limoges Cedex (FR)

( * ) Notice: Subject to any disclaimer, the term of this patent is extended or adjusted under 35 U.S.C. 154(b) by 0 days.

(21) Appl. No.: 09/622,639
(22) PCT Filed: Feb. 17, 1999
(86) PCT No.: PCT/FR99/00357
  § 371 (c)(1),
  (2), (4) Date: Oct. 12, 2000
(87) PCT Pub. No.: WO99/42421
  PCT Pub. Date: Aug. 26, 1999

(30) Foreign Application Priority Data

Feb. 19, 1998 (FR) .............................. 98 02217

(51) Int. Cl.⁷ ................................................ B29C 35/08
(52) U.S. Cl. ..................................... 264/497; 264/434
(58) Field of Search ................................ 264/434, 497

(56) References Cited

U.S. PATENT DOCUMENTS 5,053,090 A  * 10/1991 Beaman et al. ............. 156/62.2
5,354,414 A  * 10/1994 Feygin ........................ 156/630
5,382,308 A  *  1/1995 Bourell et al. .............. 156/62.2
5,639,070 A  *  6/1997 Deckard ...................... 264/497

OTHER PUBLICATIONS

Dictionary of Ceramic Science and Engineering by O'Bannon, 1984 Plenum Press, p. 232.*

* cited by examiner

Primary Examiner—Christopher A. Fiorilla
(74) Attorney, Agent, or Firm—Young & Thompson

(57) ABSTRACT

A succession of superposed digitized sections of an object are produced from a three-dimensional representation of the object. A powder or a mixture of powders is spread in the form of a fine layer and heated to a temperature close to solid phase sintering temperature of the powder or the mixture of powders. The layer is brought to the sintering temperature by scanning with a laser beam the layer such that a selected part of the powder, corresponding to one of the digitized sections of the object to be produced, is sintered in solid phase by the additional energy supplied by the laser. Additional layers of the powder or the mixture of powders are spread, heated and scanned with the laser beam until all the digitized superposed sections of the object to be produced are obtained.

4 Claims, 4 Drawing Sheets

FAST PROTOTYPING METHOD BY LASER SINTERING OF POWDER

This application is a 371 of PCT/FR99/00357 filed Feb. 17, 1999.

FIELD OF THE INVENTION

BACKGROUND OF THE INVENTION

The present invention has for its object a process for the rapid prototyping by powder sintering, particularly of ceramic powder, and a device for practicing said process.

Rapid prototyping is a process which permits obtaining pieces of complicated shapes without tools and without machining, from a three-dimensional image of the piece to be made, by sintering superposed layers of powder with the help of a laser.

A first prototyping process by laser sintering of powder is described in international patent application WO 96/06881. It permits particularly obtaining pieces of polymer by sintering in liquid phase polymeric powders. In this case, the temperature level generated by the laser is relatively low because the fusion temperatures of the polymers are not high, of the order of about 100°.

So as to obtain more resistant pieces of material, it is necessary, in this case, to use a so-called lost wax molding process.

This process for making a resistant piece is long and there is obtained a relatively mediocre dimensional precision for certain applications. Thus, numerous dispersions arising from the different processes do not permit obtaining precise dimensions of the order of ±50 µm.

A second process consists in sintering in liquid phase a mixture of powder materials, one of the materials having a relatively low melting temperature of the order of several hundreds of degrees. Here again, the temperature level generated by the laser is relatively low because of the low melting temperature of one of the materials. It should be noted that the phenomenon commonly called sintering is a sintering in liquid phase and that it is more like cementing of grains, the material of a relatively low fusion temperature being used as a binder. In this case, the piece obtained is not homogeneous and the dimensional precision is relatively mediocre. Thus, the criterion of dimensional precision is not essential in this case because the operator can easily true by machining the dimensions of the pieces thus obtained.

Another process for rapid prototyping, described in U.S. Pat. No. 5,182,170, consists in causing a powder material to react, disposed in successive layers, with a gas, by heating with the help of a laser. Thus, there can be obtained pieces from certain highly resistant ceramics thanks to chemical reactions of the nitriding or cementing type. But this process cannot be applied to all ceramics.

As can be seen, the processes of the prior art do not permit obtaining homogeneous pieces from sintered ceramic powders because the fusion temperatures of the ceramics are too high.

The devices associated with these processes comprise in general a target on which are disposed successively the layers of sintered powder, means for emplacing in layers the powder, as well as means to control the stroke of the laser. The produced piece is disposed on the upper surface of a piston which can move in a cylinder whose upper end constitutes the target.

These devices are in general used at temperatures that are not very high and do not permit obtaining pieces of precise dimensions.

However, for the production of ceramic pieces, a dimensional precision is an essential criterion because the truing of the dimensions obtained at the end of the process is possible only with the aid of a diamond tool, and remains reserved for simple point operations without involving machining.

SUMMARY OF THE INVENTION

The present invention therefore seeks to provide a process for rapid prototyping by laser sintering of any powder, and particularly ceramic powders.

It also provides the associated device, adapted to be used at high temperatures, around 900° C., and which permits obtaining by laser sintering of powders, a piece of high dimensional precision of the order of ±50 µm, which is to say half the precision obtained by devices of the prior art.

To this end, the invention has for its object a process for rapid prototyping by sintering in solid phase, with the help of a laser, of a powder of a mixture of powders, characterized in that it comprises the steps which consist in:

1/ obtaining a series of digitized superposed sections of an object to be produced, from a three-dimensional image of said object, 2/ spreading in the form of a fine layer the powder or the mixture of powders heated to a temperature near the sintering temperature in solid phase of said powder or said mixture of powders, 3/ increasing the density of the powder of the layer, 4/ bringing the layer to the sintering temperature by sweeping said layer with the help of a laser beam such that a sectioned portion of the powder, which corresponds to one of the digitized sections of the object to be produced, is sintered in solid phase thanks to the supplemental energy supplied by the laser, steps 2, 3 and 4 being repeated until all the digitized superposed sections of the object to be produced are obtained.

Preferably, the powder or the mixture of the powders is heated and held at a temperature of the order of 300° C. to 900° C., and the layer is mechanically compacted so as to increase its density.

Preferably, the laser used is a pulsed YAG laser, and the wavelength of the emitted radiation is in the near infrared.

The invention also has for its object a device for practicing said process, characterized in that it comprises a laser having control means for the stroke, in turn controlled by a computer interface, a high temperature cell provided with heating means and a target for a laser beam, a means for layering, disposed in said cell, adapted to deposit on the target a layer of powder.

According to a preferred embodiment, it comprises compacting means, disposed in the high temperature cell, adapted to compact the layer being sintering.

BRIEF DESCRIPTION OF THE DRAWINGS

Other characteristics and advantages will become apparent from the description of a preferred embodiment, which description is given by way of example only, with reference to the accompanying drawings, in which.

DETAILED DESCRIPTION OF THE INVENTION

Figure 1:
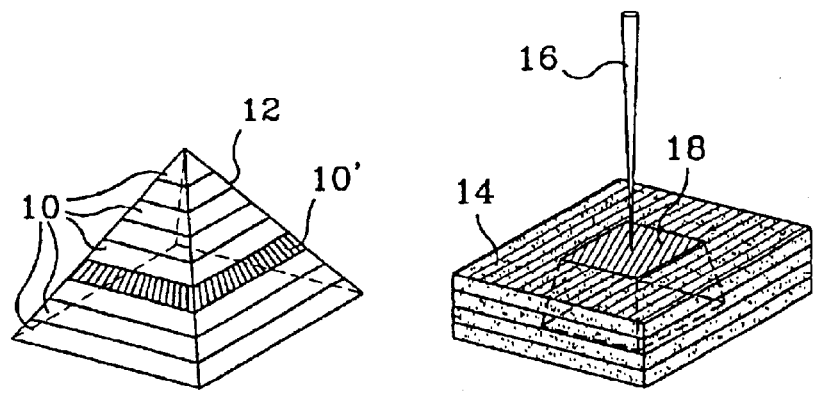
FIG. 1 is a schematic diagram of the principle of the process of the invention.

According to the invention, the process for rapid prototyping by laser sintering of a ceramic powder or of a mixture of ceramic powders, comprises the steps which consist in:

1/ obtaining a succession of digitized superposed sections 10 of an object 12 to be produced, from a three-dimensional image of said object, 2/ spreading in the form of a fine layer 14 ceramic powder or a mixture of ceramic powders heated to a temperature near the sintering temperature in solid phase of said powder or mixture, 3/ increasing the density of the powder of the layer 14, 4/ bringing the layer to the sintering temperature by sweeping said layer with the help of a laser beam 16 such that a selected portion 18 of the powder, which corresponds to one of the digitized sections 10' of the object 12 to be produced, is sintered in solid phase thanks to the energy of the laser.

Steps 2, 3 and 4 are repeated until all the digitized superposed sections of the object to be produced are obtained.

This process of rapid prototyping by laser sintering can be used for sintering any ceramic powder or mixture of powders.

During step 1, the object 12, shown by a digitized image in three dimensions, is sliced with the help of software so as to obtain a series of digitized superposed sections 10.

During step 2, the ceramic powder or the mixture of ceramic powders is spread in the form of a fine layer 14 of a thickness of the order of 200 $\mu$m. The ceramic powder or the mixture of ceramic powders is first heated and held at a temperature of 900° C. during the process so as to increase the rapidity of production of the object and to reduce the energy supplied by the laser 16 as will be explained.

During step 3, the density of the layer 14 is increased so as to decrease its porosity, by compacting it for example. There is thus obtained a layer 14 of a thickness of the order of 100 $\mu$m.

During step 4, the solid phase sintering of a selected portion 18 of the layer 14 is carried out by directing the laser beam 16 such that it reproduces one of the digitized superposed sections 10'. According to the process, solid phase sintering is used, which is to say that the sintering temperature remains below the fusion temperature of the ceramic powders used.

Thus, during sintering, in a first instance, connection regions, called grain joints, form between the particles in contact, then in a second instance, the residual porosity between the grains disappears thanks to the phenomena of diffusion and plastic flow. This sintering is the more rapid the more the sintered powder is first compacted and heated.

Thus, by heating the powder, the laser energy serves only to supply the quantity of heat necessary to raise the temperature of the powder from 900° C. to the sintering temperature. Because of this, the energy supplied by the laser is reduced and the speed of production of the object is increased.

Similarly, by first compacting the layer 14 of ceramic powder, the porosity of the powder is decreased, which permits having at the beginning of sintering a lesser residual porosity, which also contributes to increasing the speed of production.

Preferably, the laser used is a pulsed YAG laser, and the emitted radiation wavelength is in the near infrared. More precisely, the laser beam has a wavelength of 1064 nm.

For ceramic powders which do not absorb infrared radiation, there is used a dopant, for example zirconium silicate, such that the mixture thus obtained absorbs the infrared radiation emitted by the laser.

Figure 3:
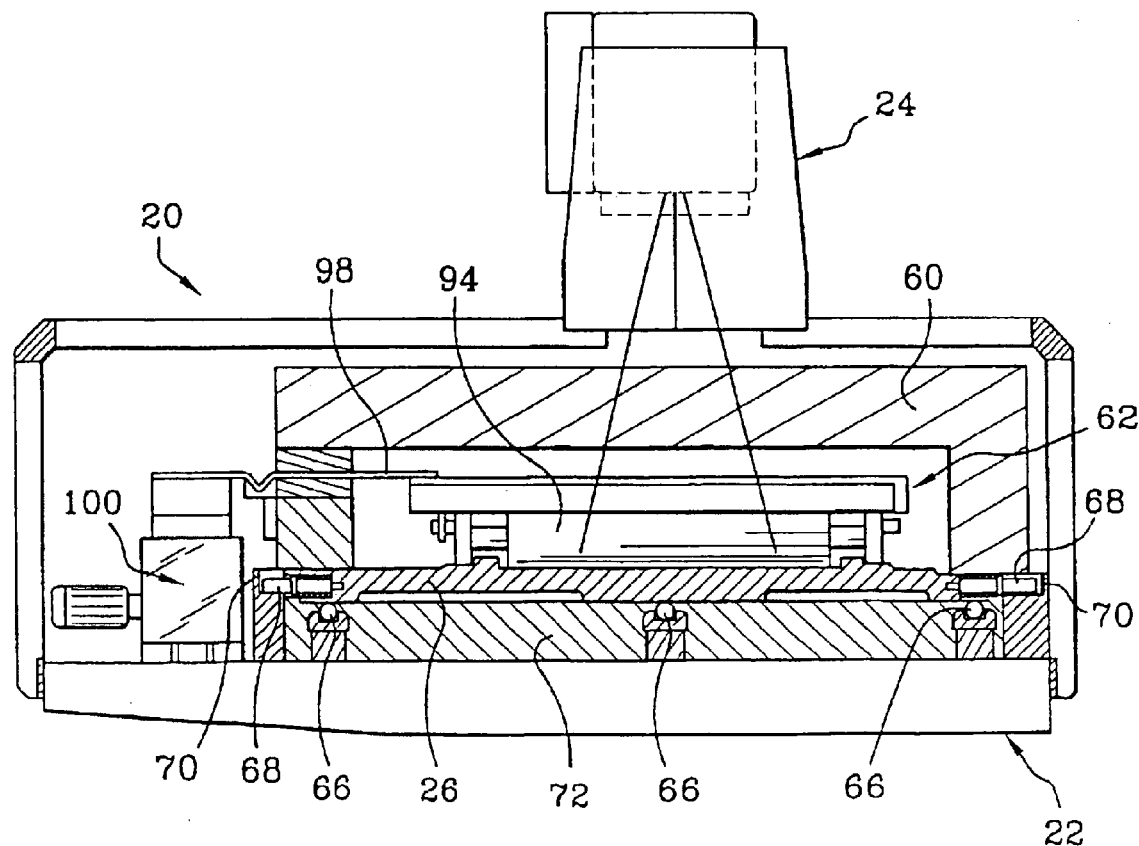
FIG. 3 is a transverse cross-section of the device.
Figure 2:
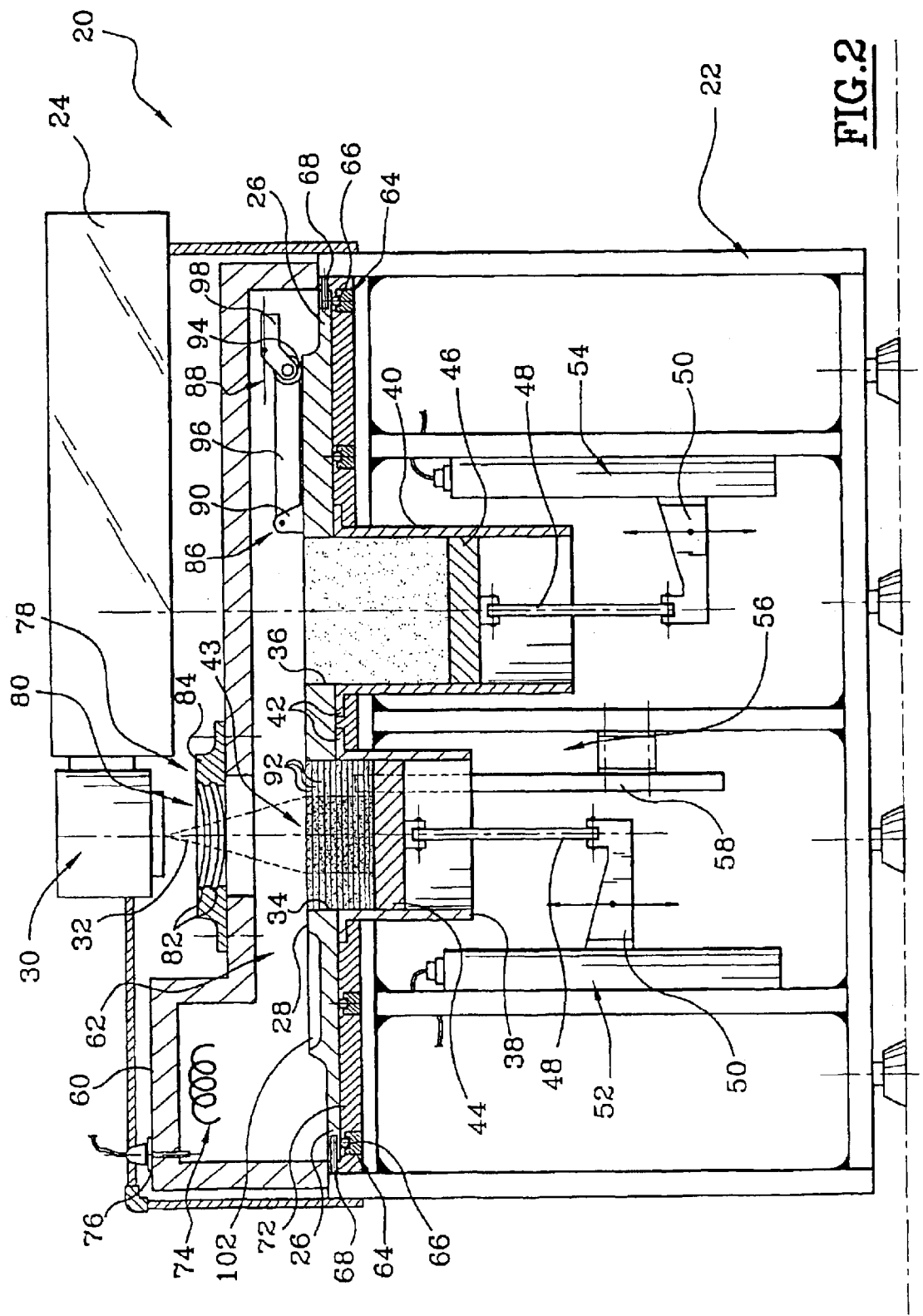
FIG. 2 is a longitudinal cross-section of the device according to the invention.

In FIGS. 2 and 3, there is shown a device 20 for practicing a process of rapid prototyping by laser sintering of ceramic powder. It is associated with a computer interface (not shown) which permits, starting from a three-dimensional image of the object to be produced, slicing said object into several layers. This interface is adapted also to control the various elements of the device 20 as will be described hereafter.

The device 20 comprises a frame 22, disposed below a laser 24, and a horizontal plate 26 disposed in part above the frame 22, and whose upper surface 28 defines a working plane.

The laser 24 comprises means 30 for controlling the stroke, subject to the computer interface, which permits particularly directing the ray 32.

These control means 30 for the stroke are known to those skilled in the art, and form no part of the present application.

The plate 26 comprises two cylindrical openings 34, 36 which are prolonged below the plate 26 by a first cylinder 38 and a second cylinder 40 whose internal diameters are equal to those of the openings 34, 36. Each cylinder is fixed by a small collar 42 to the lower surface of the plate 36 by securement means (not shown), screws for example.

The first cylinder 38, prolonged by the opening 34, is called the working cylinder. It is disposed below the laser beam 32, and its upper end, which is flush with the working plane 28, defines a target 43 for said beam. Similarly, the second cylinder 40, prolonged by the opening 36, and disposed adjacent the first cylinder 38, serves as a reservoir for first powdered ceramic material.

Pistons 44, 46 are provided to move in translation respectively in the cylinders 38, 40. Each piston 44, 46 is fixed to the upper end of a rod 48, whose lower end is fixed to an arm 50 connected to means 52 and 54 for controlling the pistons 44, 46, respectively. These control means 52 and 54, in the form for example of a stepping motor, are subject to the computer interface which controls the rising and falling of said pistons.

Means 56 for measuring the real height of the upper surface of the piston 44 are provided, to compensate dimensional disparities arising from mechanical connections and/or deformation by expansion of the different elements, so as to obtain a dimensional precision of the order of ±50 $\mu$m. These measuring means 56 are formed by an optically read scale 58, which is vertical, and fixed to the frame 22 adjacent the working cylinder 38.

Above the plate 26, a thermally insulated chamber 60 permits delimiting with the plate 26 a high temperature cell 62. The plate 26 is connected to the frame 22 by insulating connection means 64 which permit limiting the propagation of deformations due to expansion of the plate 26 toward the frame 22. According to a preferred embodiment, these insulating connecting means 64 comprise on the one hand balls 66 disposed in the upper portion of the frame 22, on which the plate 26 rests, and on the other hand pins 68, fixed to the sides of the plate 26, which rest in recesses 70 of the frame 22 as seen in FIG. 3.

In addition, a layer 72 of insulating materials is disposed below the plate 26 so as to render the high temperature cell 62 as adiabatic as possible.

On the other hand, heating means 74, in the form of a resistance, are disposed inside the cell 62, so as to heat the atmosphere of the cell to a temperature of the order of 900° C. In addition, temperature control means 76, in the form of a thermocouple, permit regulating the temperature within the cell.

A window 78, of a diameter substantially equal to the working cylinder 38, is provided in a thermally insulated chamber 60 in line with the beam 32 and the working cylinder 38. This window 78, which is thermally insulated, comprises filtering means 80, which let pass the near infrared radiation of the laser toward the working cylinder 38, but which filter out radiation emitted by the black body which constitutes the high temperature cell 62, toward the laser 24. These filtering means 80 permit limiting the heating of the head of the laser 24 during its operation. They are comprised by two superposed lenses 82, adapted to resist high temperatures, disposed in a lens support 84.

On the working plane 28, means 86 for forming a layer and means 88 for compacting, can move in the direction defined by the right angle line connecting the centers of the cylinders 38, 40.

The layering means 86, comprised by a screed 90, permit transferring the ceramic powder from the reservoir 40 toward the working cylinder 38, so as to deposit the powder in the form of successive layers 92 of equal thicknesses in the working cylinder 38.

The compacting means 88, in the form of a compacting roller 94, permit compacting the powder of the layer 92 before its sintering.

Two rods 96, disposed at each end of the roller 94, permit connecting the screed 90 to the compacting roller 94 which is fixed to an arm 98 connected to control means 100 for the layering means 86 and compacting means 88. These control means 100, in the form for example of a stepping motor, are also controlled by the computer interface which at the same time controls the movements of the pistons 44, 46, the movements of the screed 90 and of the roller 94, as will be explained hereafter.

A recess 102 is also provided in the working plane 28 beside the opening 34, diametrically opposite the opening 36. This recess is adapted to recess the surplus powder when the screed 90 transfers the powder from the reservoir 40 to the working cylinder 38.

The operation will now be described with respect to FIGS. 4A to 4E.

Figure 4A:
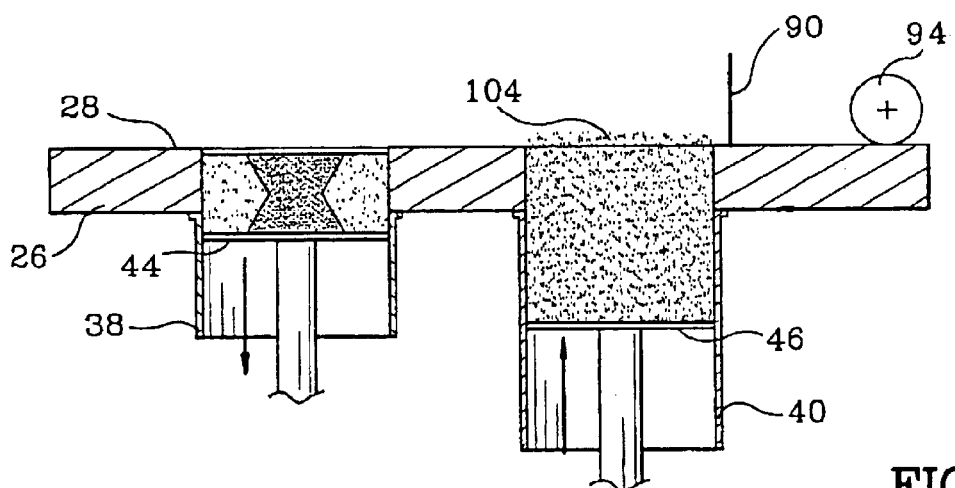
FIGS. 4A to 4E show a synopsis of the operation of the device.

In FIG. 4A, there is schematically shown the device in phase 0 of the process. During this phase, piston 44 of the working cylinder descends by 200 $\mu$m, whilst the piston 46 of the reservoir 40 rises by 200 $\mu$m so as to dispose a volume 104 of ceramic powder above the working plane 28.

Figure 4B:
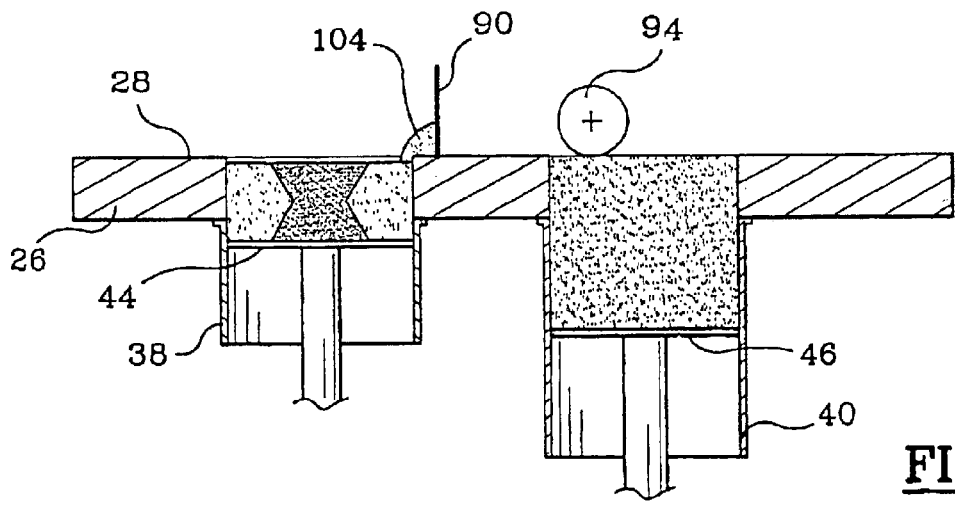

During phase 1, shown in FIG. 4B, the screed 90 pushes the volume 104 of ceramic powder, and spreads it uniformly in the form of a layer 106 in the working cylinder 38. The volume 104 of powder must be sufficient to avoid a shortage of powder in the working cylinder 38, and to obtain a layer 106 which is flush with the working plane 28.

Figure 4C:
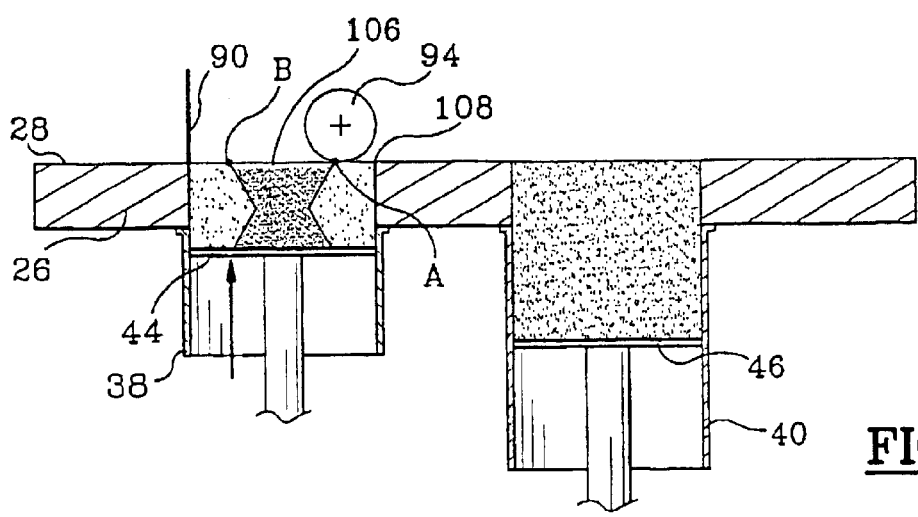

During phase 2, shown in FIG. 4C, the screed 90 has finished spreading the quantity 104 of powder, and the roller 94 is located at point A at the surface of the layer 106 adjacent a first point of tangency 108 of said roller with the working cylinder 38. At this time, the piston 44 of the working cylinder 38 rises by 100 $\mu$m such that a portion of the layer 106 is disposed above the working plane. The roller 94 then compacts a region 110 of the layer 106 which extends from point A to point B located at the surface of the layer 106 adjacent a second point of tangency 112 of said roller with the working cylinder 38.

Figure 4D:
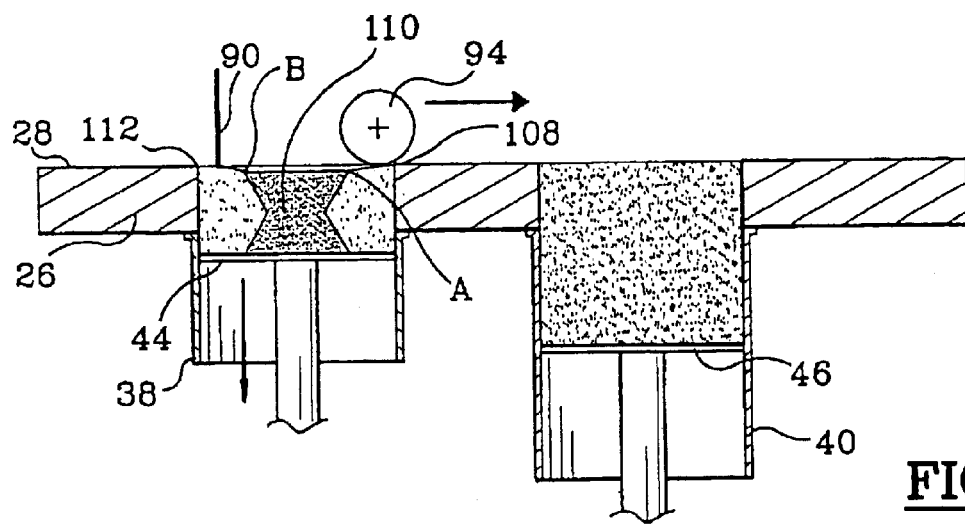

During phase 3, shown in FIG. 4D, the piston 44 of the working cylinder descends by 100 $\mu$m, to avoid compacting the edges of the working cylinder 38. The roller 94, as well as the screed 90, return to the initial position shown in FIG. 4A.

Figure 4E:
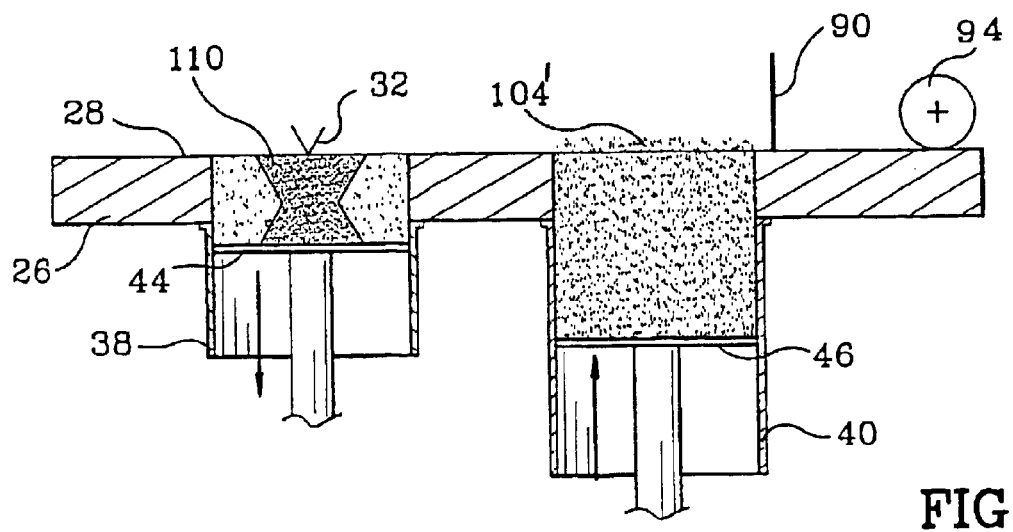

During phase 4, shown in FIG. 4E, the ceramic powder in the compacted region 110 is sintered according to the process of the invention, so as to obtain the shape of the object. After sintering, the piston of the working cylinder descends by 100 $\mu$m, and the piston 46 of the reservoir rises by 200 $\mu$m, so as to place a new volume 104' of ceramic powder above the working plane 28 and to return to phase 1.

Thus, the phases 1, 2, 3 and 4 are repeated for each new layer until the desired object is obtained. During all these phases, the heating means 74 maintains the cell 62 at a temperature of the order of 900° C. Thus, the sintered powder is already at a temperature of the order of 900° C., which permits limiting the quantity of energy necessary for sintering and to increase the speed of production of the object.

The process of the invention and the associated device have been described for the production of pieces from ceramic powder, but there can be envisioned, in exactly the same way, by simple adaptation of the different parameters, their use for obtaining pieces of any material, and particularly from metallic powders.

What is claimed is:

1. A process for the rapid prototyping by sintering in solid phase, with a laser, of a powder or a mixture of powders, comprising the steps of:

1/ obtaining a series of digitized superposed sections of an object to be produced, from a three-dimensional representation of said object;

2/ spreading the powder or mixture of powders in the form of a thin layer;

3/ heating the layer at a temperature near the sintering temperature in solid phase of said powder or said mixture of powders;

4/ bringing the heated layer to the solid phase sintering temperature to create grain joints between particles of said powder or said mixture of powders by sweeping with a laser beam said layer such that a selected portion of the powder, which corresponds to one of the digitized sections of the object to be produced, is sintered in solid phase by the supplemental energy supplied by the laser; and repeating steps 2 to 4 while maintaining said heating until all the digitized superposed sections of the object to be produced are obtained.

2. The process according to claim 1, wherein the powder or mixture of powders consists of ceramic material.

3. The process according to claim 2, wherein the powder or mixture of powders is heated and held at a temperature of the order of 300° C. to 900° C.

4. The process according to claim 2, wherein the laser comprises a pulsed YAG laser having a wavelength of emitted radiation near infrared.

* * * * *